May 2, 1950　　　H. A. STRICKLAND, JR　　　2,505,808
POWER UNIT SEQUENCE CONTROL
Filed April 18, 1945
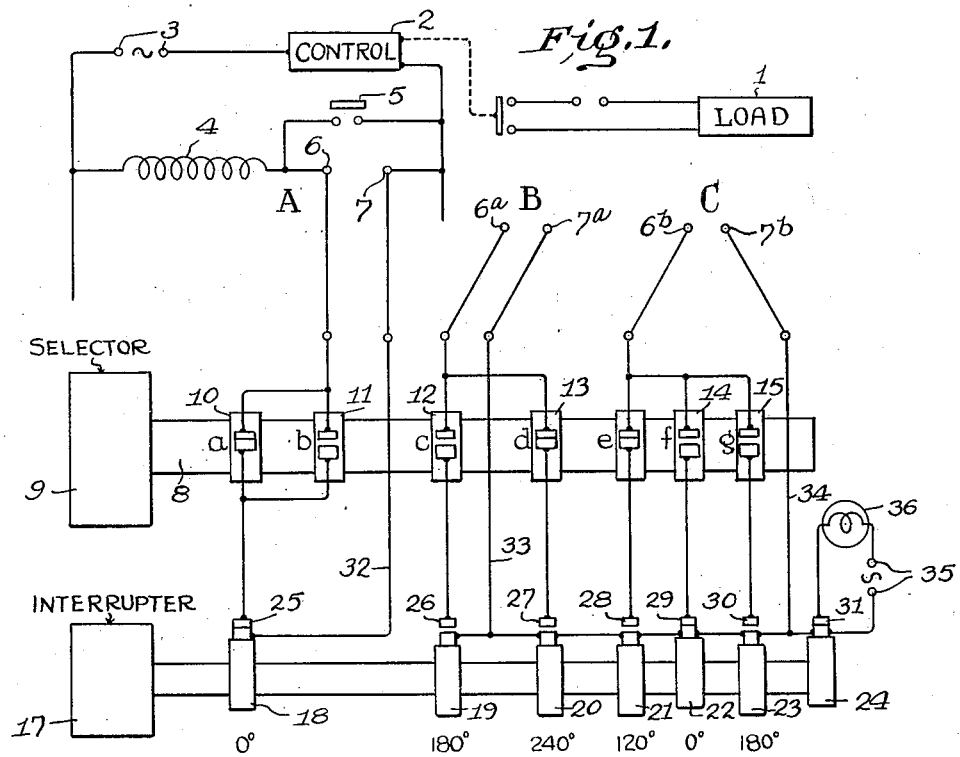
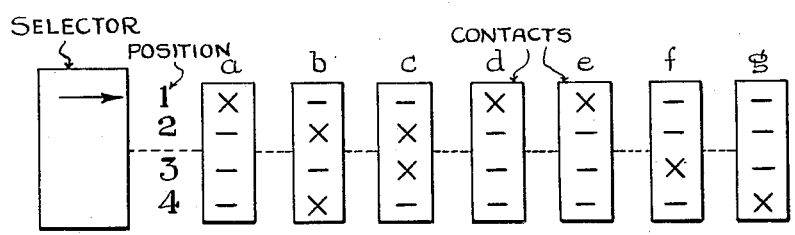
Harold A. Strickland Jr.
INVENTOR
BY John P. Tarbox
ATTORNEY Patented May 2, 1950

2,505,808

UNITED STATES PATENT OFFICE 2,505,808

POWER UNIT SEQUENCE CONTROL

Harold A. Strickland, Jr., Detroit, Mich., assignor, by mesne assignments, to The Ohio Crankshaft Company, Cleveland, Ohio, a corporation of Ohio Application April 18, 1945, Serial No. 589,053

5 Claims. (Cl. 161—1)

This invention relates to a sequence control system for controlling the time of application of power to selected units of a bank of load units. The invention has particular applicability to a bank of induction heating furnaces.

In induction heating it is customary to employ a bank of furnaces and it is desirable that the times for initiating the heating cycle in the various furnaces be stepped one from the other so that the loading and unloading intervals will not occur simultaneously. In this way one operator can efficiently maintain operation of a number of furnaces. Obviously the time of heating in each furnace varies with the nature of the load and other variables so that for each run it is necessary to set up the overall time for loading, unloading and heating in a single furnace and then adjust the time uniformly between the several units of the furnace bank.

Accordingly a primary object of the present invention is to provide apparatus which by a simple adjustment selects any desired unit of a bank of load units such as induction furnaces. Another object of the invention is to provide an arrangement of apparatus which will automatically divide the heating, loading and unloading cycle into time periods equal to the number of units employed. An additional object is to provide means for fixing the time interval for the overall heating, loading and unloading cycle.

A more specific object of the invention is to provide a new and improved power control for a group of at least three power-operated units, the system including a plurality of timer controls on a continuously operating timer device, any one of which controls, on actuation, is adapted to apply power to or interrupt the power to one of the units for a predetermined part of a total time cycle of the device, the system also including, in combination, a selector device associated with the timer device for placing a selected two or more of the power units under the control of selected timer controls in such relationship that the periods of interruption of power of each unit are separated from each other in the total time cycle.

Other objects will appear on consideration of the following description of one form of my invention and of the accompanying drawing, in which:

Figure 1 is a diagrammatic view indicating the relation of the selector unit and interrupter units to the load circuit; and Figure 2 is a schematic showing of the contact relationship of the selector.

In my copending application, Serial No. 384,503, filed March 21, 1941, now Patent No. 2,408,350, issued September 24, 1946, I described a circuit applicable to an induction heating furnace employing high frequency currents. In this, use is made of a so-called sequence switch which constitutes a means for permitting functioning of a bank of furnaces in consecutive order, in accordance with the closure of a key branch circuit in the main circuit of each unit.

In Figure 1 a load such as an induction heating furnace is indicated by the box 1. Associated with this load is a control 2, the functioning of which brings about closure of appropriate switches to turn on the power in the furnace unit. The control includes in series therewith a source of power 3, a relay coil 4, a lock-in relay switch 5 and a circuit having terminals 6 and 7 in parallel with the relay switch 5 which passes into and is incorporated within the selector and interrupter units. Inasmuch as the furnace and control sections of the furnace are identical, the circuits in furnaces B and C are not duplicated in the drawing.

The selector unit comprises a shaft 8 having a knob 9 for manual rotation of the same. On the shaft is mounted a plurality of cams numbered 10, 11, 12, 13, 14 and 15. Each of these cams is adapted to actuate contact points of a series of associated contact switches designated by the letters a, b, c, d, e, f, and g. On rotation of the selector knob 9, certain groups of these switches are alternatively opened and closed and by setting the selector shaft at a predetermined point of rotation, it is possible to select any desired group of conductors for closure. With closure it is apparent that current may pass between the conductors.

In order to illustrate the action of the selector switch more fully, reference is made to Figure 2 of the drawing where the various possible positions of the selector are indicated schematically with the corresponding position of the contact switches as lettered a to g. It will be seen that in the example chosen, that is, with the arrow 16 on the selector knob opposite the position 1, that contact switches a, d and e are closed, closure being indicated by an X. Referring back to Figure 1 it will be observed that the contact switches a, d and e are shown closed also, this corresponding to the positioning of the arrow in Figure 2. Movement of the selector knob to position 2 would bring about closure of contacts b and c in accordance with the showing of Figure 2. Other variations of contact closure may be secured at positions 3 and 4. Obviously additional positions could be added provided appropriate provisions were made on the selector and interrupter units.

The interrupter unit is indicated as likewise formed of an extended shaft mounted for rotation as is the case with the selector shaft but the interrupter shaft has connection to a motor 17 which is designed for accurate speed setting so that the operator may set the motor for a uniform rate of rotation. This may be accomplished by utilizing the control arrangement as set out in my copending application Serial No. 545,661, filed July 19, 1944, now abandoned. Mounted on the motor rod or shaft are a series of circumferentially displaced cams 18, 19, 20, 21, 22, 23, and 24. Each of these cams is adapted to operate contact switches numbered respectively 25, 26, 27, 28, 29, 30 and 31. The function of the interrupter cams 25—30 is to time the energization of the 6—7, 6a—7a, and 6b—7b circuit branches in the total heating, loading and unloading cycle of the furnace and to this end the contact switches 25—30 are selectively displaced with reference to a plane passing axially through the motor shaft. This displacement is indicated by the degree insignia placed directly beneath each cam, this insignia being from left to right; zero degrees, 180 degrees, 240 degrees, 120 degrees, zero degrees and 180 degrees. By this is meant that with reference to the cam 18 the contact switch of cam 19 is displaced circumferentially about the shaft axis 180 degrees. It is noted that some of the cams are positioned along the same axial plane as others, bearing the same insignia such as zero degrees or 180 degrees to indicate their position relative to the first cam 18.

Referring again to the circuit, it will be seen that the branch 6—7 of the control circuit leads from the terminal 6 through the selector contacts a and b in parallel branches and then passes through the contact switch 25 at the cam 18 in the interrupter unit, returning to the terminal 7 by the conductor 32. The corresponding circuit in the B unit leads from terminal 6a through selector contact switches c and d to the interrupter contact switches 26 and 27 in parallel, returning by conductor 33 to the terminal 7a. Also in the C unit from terminal 6b the conductor leads through contacts e, f and g through interrupter contacts 28, 29 and 30 in parallel, the circuit continuing to terminal 7b through conductor 34.

In addition to the cam and contact switches mentioned as being connected in the control branch circuits 6—7, 6a—7a and 6b—7b, the additional cam 24 with its contact switch 31 is intended for the fixing of the overall time period for heating, loading and unloading in a complete heat treating cycle when the apparatus is employed in connection with induction heating. A circuit is formed including the contact switch 31, a source of power 35 and an in-indicator lamp 36. The cam functions so that on rotation of the motor shaft, at each rotation the lamp is lighted at a given cam point of contact actuation.

The operation of the sequence control may now be described. Assuming that there are as indicated in Figure 1, three loads, such as three induction furnaces which are to be employed selectively in heating operations as for example the heating of bars for subsequent heat treatment, the first step of the operator is to determine the exact time through which the load is to be heated and to this time is added the time as determined by experience for inserting the load and the time for removing the load from the furnace, the sum of these time periods constituting the complete cycle of treatment. For example, it may be assumed that a series of bars are to be heated and that the loading and unloading time period is twelve seconds, or six seconds for each step. Also the heating period is determined to be sixty seconds, so that the total cycle is seventy-two seconds. The operator then starts the motor 17 and with a stop watch times the period between lamp flashes of lamp 36 due to rotation of cam 24 on the motor shaft and adjusts the speed of rotation to seventy-two seconds for one complete revolution. The motor may then be stopped for adjustment of the selector. The operator then decides which of the furnace units he intends to use. His selection may be A and C or it may be A and B or it may be A, B and C. If he should decide to employ the three furnaces A, B and C he places the selector switch at position 1 which indicates closure for a, d and e. On inspection of the corresponding contact switch in the selector unit, it will be seen that contact a is in the A unit, contact d is in the B unit and contact e is in the C unit. With the A, B and C furnace units now ready for functioning, the interrupter unit motor is rotated at the predetermined set speed and, in the example as given, at predetermined points corresponding to zero degrees, 240 degrees, 120 degrees, interrupter contacts are closed consecutively energizing relay coil 4 and locking-in relay switch 5 to energize the control circuit and heating unit. Accordingly in the complete seventy-two second cycle beginning with the start of operation of the A furnace the three furnaces A, B and C are all on together for 12 seconds, then furnace C is de-energized for 12 seconds for unloading and loading while furnaces A and B continue heating, then all three furnaces heat again for 12 seconds, then furnace B is de-energized for 12 seconds while furnaces A and C continue to heat, then all three furnaces heat again for 12 seconds, and finally furnace A is de-energized for 12 seconds for loading and unloading.

Should the operator have work requiring the use of only two of the furnaces, as for example the A and B furnaces, the selector is placed at position 2 and it will be seen that the corresponding interrupter cams are now positioned 180 degrees apart, thus dividing equally the off-heating period in the total time period which may be seventy-two seconds, as in the first example. Similarly the B and C furnaces or the A and C furnaces may be employed. It is pointed out that the selection of the particular furnaces to be used together with the uniform displacement of the point of initiation of loading of the furnace selected is accomplished automatically merely by rotation of the selector knob 9 to the desired position. This selector may be placed in the generator room or any other point as desired. By this means a very considerable amount of time is saved in making adjustment for different types of workpieces and the overall cost of furnace bank operation is thus materially reduced.

Modifications such as may be developed from different types of loads or different numbers of load units in a given bank of units, may of course be made within the spirit and scope of this invention and therefor no limitation is implied in the above detailed description other than

What is claimed is:

1. A power control system compriisng in combination, a group of at least three power operated units, a continuously operating timer device provided with a plurality of timer controls, any one of which is adapted to apply power to a single unit for a predetermined part of a total time cycle of said device and to interrupt the application of power for a predetermined part of the total time cycle, and a single selector device for placing a selected two or more of said power operated units under the control of selected timer controls of said timer device in such relationship that the periods of interruption of power are separated from each other in the total time cycle.

2. A power control system comprising in combination, a group of at least three power operated units, a continuously operating timer device provided with a plurality of timer controls, any one of which is adapted to apply power to a single unit for a predetermined part of a total time cycle of said device and to interrupt the application of power for a predetermined part of the total time cycle, and selector means for placing any desired two or more of said power operated units under the control of said timer device in such order that the periods of interruption of power are equally spaced in the total time cycle regardless of the number of units selected for operation.

3. A power control system comprisng in combination, a group of at least three power operated units, a continuously operating timer device having adjustability as to its total time period or cycle and provided with a plurality of timer controls, any one of which is adapted to apply power to a single unit for a predetermined part of a total time cycle of said device and to interrupt the application of power for a predetermined part of the total time cycle, and a single selector device for placing a selected two or more of said power operated units under the control of selected timer controls of said timer device in such relationship that the periods of interruption of power are separated from each other in the total time cycle.

4. A power control system comprising in combination, a group of at least three power operated units, a continuously operating timer shaft provided with a plurality of timer cams, any one of which is adapted to apply power to a single unit for a predetermined part of a total time cycle of said timer shaft and to interrupt the application of power for a predetermined part of the total time cycle, said cams being set at various circumferentially spaced positions and being sufficient in number to provide equal angular spacing for any number of units desired, and a selector shaft provided with a plurality of elements for selecting any two or more of said units and placing them under the control of such timer cams as will provide equal time spacings for their periods of power interruption.

5. In a high-frequency, induction-heating furnace system including in combination a group of at least three induction-heating loads, a continuously-operating timer device having a predeterminable timing cycle and provided with a plurality of switch actuators each operable at least once in a timing cycle, the number of actuators being a function of the number of loads up to the maximum, each actuator being displaced on a time basis from the other actuators throughout the principal timing cycle as a function of the number of heating loads up to the maximum to be energized, a selector switch for placing a selected one or more loads under the control of predetermined ones of said actuators, the actuators selected by said switch being dependent on the total number of loads selected to be consecutively energized by said timer device, whereby said loads may be energized at predetermined spaced intervals in said timing cycle.

HAROLD A. STRICKLAND, Jr.,

REFERENCES CITED

The following references are of record in the file of this patent:

UNITED STATES PATENTS

| Number | Name | Date |
|---|---|---|
| 1,541,600 | Steenstrup | June 9, 1925 |
| 2,039,851 | Silverman | May 5, 1936 |
| 2,115,827 | Powell | May 3, 1938 |
| 2,116,787 | Hart | May 10, 1938 |
| 2,194,586 | Brown et al. | Mar. 26, 1940 |
| 2,194,587 | Brown et al. | Mar. 26, 1940 |
| 2,212,868 | Strong | Aug. 27, 1940 |
| 2,294,573 | Potter | Sept. 1, 1942 |

FOREIGN PATENTS

| Number | Country | Date |
|---|---|---|
| 516,349 | Great Britain | May 26, 1939 |